United States Patent [19]

Asal

[11] 4,026,368
[45] May 31, 1977

[54] VEHICLE WITH IMPLEMENT CONNECTED THERETO BY STABILIZING LINKAGE

[75] Inventor: Jerrold R. Asal, Channahon, Ill.
[73] Assignee: Caterpillar Tractor Co., Peoria, Ill.
[22] Filed: July 9, 1975
[21] Appl. No.: 594,398
[52] U.S. Cl. .................................. 172/809; 74/103; 172/801; 248/276
[51] Int. Cl.² ..................... E02F 3/76; F16H 21/04
[58] Field of Search .......... 172/801, 802, 803, 804, 172/805, 806, 807, 808, 809; 248/276, 277, 284; 74/103, 104

[56] References Cited

UNITED STATES PATENTS

| | | | |
|---|---|---|---|
| 2,823,710 | 2/1958 | Angel | 74/104 X |
| 3,501,120 | 3/1970 | Daniel, Jr. | 248/276 |
| 3,680,395 | 8/1972 | Douglas | 74/103 X |
| 3,680,881 | 8/1972 | Douglas | 74/103 X |
| 3,690,386 | 9/1972 | Magee | 172/804 |
| 3,825,074 | 7/1974 | Stedman et al. | 172/803 |

FOREIGN PATENTS OR APPLICATIONS 562,338   6/1944   United Kingdom ................ 74/103

*Primary Examiner*—Richard T. Stouffer
*Attorney, Agent, or Firm*—Phillips, Moore, Weissenberger, Lempio & Majestic

[57] ABSTRACT

A stabilizing linkage for a material handling implement such as a bulldozer blade mounted at one end of a vehicle, the linkage including a coupler link pivotably connected to the bulldozer blade and extending diagonally between the blade and vehicle with control links of different lengths being pivotably interconnected between the coupler link and the vehicle, an additional coupling restraining movement of the other end of the coupler link relative to the vehicle.

2 Claims, 3 Drawing Figures

VEHICLE WITH IMPLEMENT CONNECTED THERETO BY STABILIZING LINKAGE

BACKGROUND OF THE INVENTION

The present invention relates to a stabilizing linkage for resisting side loading applied to material handling implements and more particularly to such a stabilizing linkage arranged between a vehicle and a bulldozer blade mounted at one end thereof by means of lift arms.

The problem of resisting side loading upon implements such as bulldozer blades is well-known in the prior art and a number of stabilizing linkages have been contemplated or proposed as a solution. Probably the most commonly employed linkage arrangement includes one or more diagonal braces interconnected between the vehicle and blade for resisting such side loads. However, the diagonal braces have been found to require substantial spacing between the blade and the vehicle which is generally undesirable for a number of reasons. For example, it becomes necessary to lengthen the lift arms and thereby increase their weight as well as the moment arms for raising and lowering the blade. In addition, the implement or bulldozer blade may also require further strengthening of its mounting arrangement in order to overcome or limit instability created by the spacing between the blade and the vehicle.

Accordingly, there has been found to remain a need for a stabilizing linkage capable of resisting side loads upon the implement or blade while also permitting close coupling of the implement or blade relative to a machine or implement upon which it is supported.

SUMMARY OF THE INVENTION

Accordingly, it is an object of the present invention to provide a stabilizing linkage for fulfilling the need referred to above and additionally overcoming one or more problems of the type outlined above.

It is an additional object of the invention to provide such a stabilizing linkage which provides for substantially straight line movement between the implement and the machine upon which it is mounted.

It is a further object of the invention to provide such a stabilizing linkage including a coupler link having one end pivotably connected to the implement while being arranged diagonally between the implement and machine upon which it is mounted with first and second control links being pivotably interconnected between the coupler link and the machine.

It is an even further object of the invention to provide such a stabilizing linkage further comprising means for restraining movement of the other end of the coupler link relative to the machine.

Additional objects and advantages of the invention are made apparent in the following description having reference to the accompanying drawings.

DESCRIPTION OF THE PREFERRED EMBODIMENT

Figure 1:
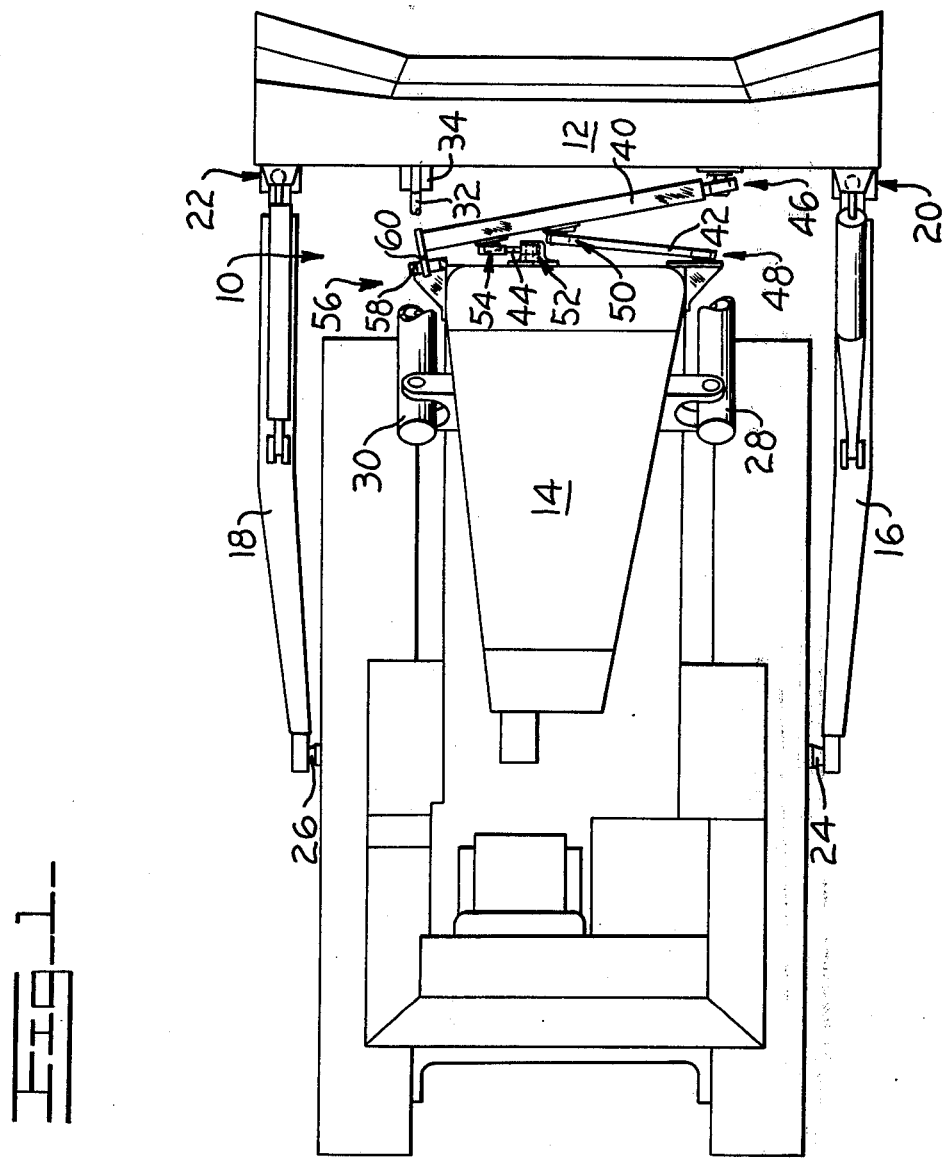
FIG. 1 is a plan view of a crawler tractor having a bulldozer blade mounted at one end thereof with a stabilizing linkage according to the present invention being arranged between the vehicle and blade.
Figure 2:
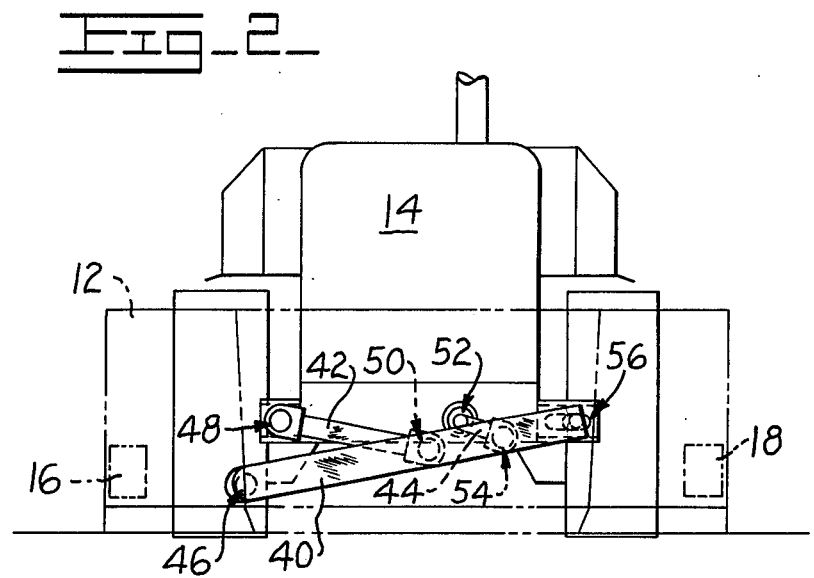
FIG. 2 is a front view of the vehicle of FIG. 1 with the bulldozer blade being represented in phantom to better illustrate the stabilizing linkage.

A stabilizing linkage according to the present invention is illustrated within the drawings as a means for resisting side loads applied to a bulldozer blade which is mounted upon a suitable vehicle by means of lift arms. However, it will be apparent that the stabilizing linkage may also be employed to resist side loading upon other material handling implements which may be similarly subject to side loading.

The stabilizing linkage of the present invention basically comprises a three link, four pivot point combination which is similar in certain respects to a straight-line linkage disclosed, for example, in the June 8, 1970 issue of *Product Engineering*. Additional embodiments of a straight line carrier device including more complex linkages may also be seen, for example, by reference to U.S. Pats. Nos. 3,291,431 and 3,426,994 issued to J.A. Daniel, Jr. Each of the straight line linkages described in these references performs a similar function of limiting movement of an object or component to substantially a straight line path.

Because of the pivotable interconnection between various components making up such straight-line linkages, some variation from the desired straight line path appears to exist. However, such variations are so slight as to be difficult to detect.

Referring now to the drawings, the stabilizing linkage of the present invention is generally indicated at 10 in association with a bulldozer blade 12 mounted at one end of a crawler tractor 14. The bulldozer blade 12 is conventionally mounted upon the tractor by means of lift arms 16 and 18, the lift arms being coupled with the bulldozer blade 12 by means of pivot joints indicated respectively at 20 and 22. The lift arms 16 and 18 extend rearwardly along opposite sides of the vehicle and are conventionally coupled with the vehicle by means of pivot connections indicated respectively at 24 and 26.

The bulldozer blade 12 may be raised and lowered upon the lift arms 16 and 18 under the influence of hydraulic jacks which are partially illustrated at 28 and 30. Each of the jacks 28 and 30 has an extendable and retractable portion coupled with the blade 12. For example, a rod portion of the jack 30 is illustrated at 32 as being pivotably secured at 34 to the blade 12.

Figure 3:
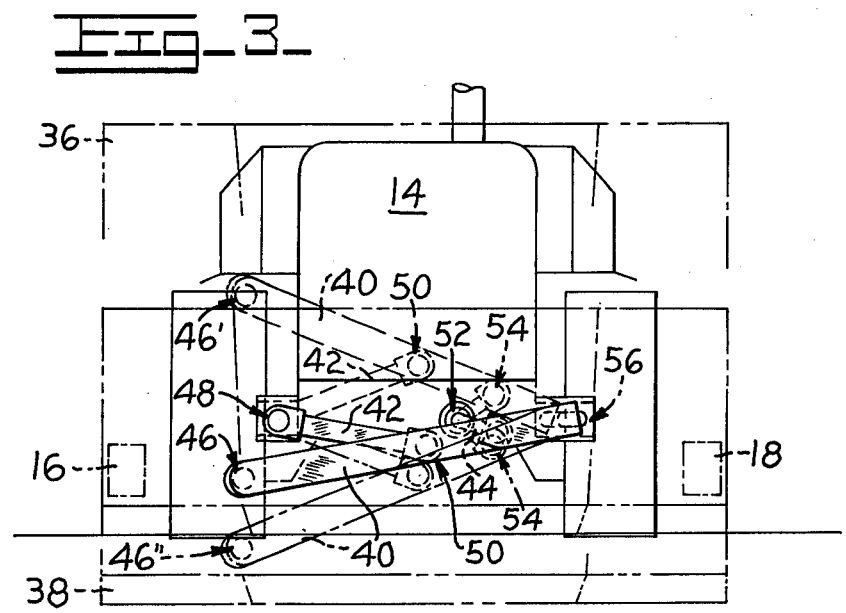
FIG. 3 is also a front end view of the vehicle similar to FIG. 2 while illustrating the path of movement for the bulldozer blade relative to the tractor.

As may be best seen in FIG. 3, the blade 12 may be moved by the jacks 28 and 30 between a raised position illustrated in phantom at 36 and a lowered position similarly illustrated in phantom at 38. It will be apparent from FIG. 3, in particular, that the blade 12 moves along a substantially straight line path between the raised and lowered positions indicated at 36 and 38.

The present invention particularlfy contemplates providing a stabilizing linkage for resisting substantial side loads of the type which may be conventionally applied to such massive material handling implements as the bulldozer blade 12. The stabilizing linkage 10 basically includes a coupler link 40 and two control links 42 and 44 which pivotably interconnect the coupler link with the vehicle. One end of the coupler link is pivotably connected with the bulldozer blade 12 to limit it to straight line movement in order to resist side loads applied to the blade. As may be best seen in FIG.

1, one of the links, for example that indicated at 42 is substantially longer than the other link 44. In addition, it may be seen that the two control links 42 and 44 are arranged generally parallel to each other while each forms an acute angle relative to both the blade 12 and a transverse axis of the vehicle 14. As illustrated within FIG. 1, the shorter control link 44 appears to be almost perpendicular to the longitudinal axis of the vehicle 14.

It may also be generally seen from FIG. 1 that the coupler link 40 is arranged in generally diagonal relation between the blade 12 and the vehicle 14 while permitting close coupling between those components by means of the lift arms 16 and 18. This is a particularly important feature of the present invention as was also indicated above.

To describe the stabilizing linkage in greater detail, one end of the coupler link 40 is pivotably connected at 46 to the rear of the bulldozer blade 12. Preferably, the pivotable coupling 46 is a ball joint. Each of the control links 42 and 44 is pivotably interconnected between the tractor 14 and the blade 12 by means of pivotable joints indicated respectively at 48, 50, 52 and 54. At least one of the pivotble connections for each of the control links 42 and 44 is also a ball joint. For example, it may be seen that each of the pivotable connections 48 and 50 for the longer link 42 comprises a similar ball joint as does the pivot connection 54 arranged between the shorter control link 44 and the bulldozer blade 12. The other pivot connection 52 which connects the shorter control link 44 with the tractor is of a type providing rotation about a single axis in order to more accurately limit movement of the coupler link 40 and more closely define movement of the pivot connection 46 along a straight line path as may be best seen in FIG. 3.

Referring momentarily to FIG. 3, the pivot connection 46 assumes a position indicated at 46' when the bulldozer blade is in its raised position indicated at 36. Similarly, the pivot connection 46 assumes a position illustrted at 46" when the bulldozer blade is in its lowered position 38. FIG. 3 particularly illustrates that the three positions of the pivot connection indicated respectively at 46, 46' and 46" forms a substantially straight line in order to permit the bulldozer blade to be raised and lowered by the lift arm 16 and 18 while resisting side loads applied thereto.

The relative lengths for the coupler link 40 and the control links 42 and 44 is of critical importance within the present invention as well as the relative locations of their pivot connections 46–54 with respect to each other as well as the bulldozer blade 12 and the vehicle 14. The connection 50 is arranged generally at a central point along the coupler link 40 while the pivot connection 48 is arranged generally at one side of the vehicle 14. The pivot connection 46 between the one end of the coupler link 40 and the bulldozer blade 12 is also arranged generally adjacent the same side of the vehicle.

Referring to FIG. 3, as the blade is moved between its raised position 36 and its lowered position 38, the coupler link 40 assumes various angled positions relative to a generally horizontal line formed by the pivot joints 48 and 52. It has been found to be important within the present invention to provide additional restraint over the coupler link particularly when the coupler link passes through a horizontal line formed by the joints 48 and 52. For that purpose, an additional coupling is provided at 56 for restraining movement of the other or rearward end of the coupler link 40. As may also be seen in FIG. 3, the coupling 56 is also arranged in generally horizontal relation with the pivot connection 48 and 52 and upon the opposite side of the vehicle from the pivot connection 48. Preferably, as may be best seen in FIG. 1, the coupling 56 comprises a slotted bracket 58 for receiving a pin 60 extending rearwardly from the other end of the coupler link 40. In this manner, the coupling 56 permits limited pivotable movement as well as sliding movement for the pin 60 and accordingly for the coupler link 40. Thus, the straight line path followed by the pivot coupling 46 is primarily established by the arrangement of the two control links 42 and 44 between the vehicle 14 and the coupler link 40. The coupling 56 provides additional support within the stabilizing linkage in the manner described immediately above.

What is claimed is:

1. In a vehicle having a massive material handling implement at one end of said vehicle by means of lift arms pivotably connected to said vehicle and extending outwardly from said end of said vehicle for raising and lowering said implement through a vertical path, said implement being subject to horizontal side-loading forces, the improvement comprising:
    a. a coupler link having one end thereof pivotably connected to said implement and extending diagonally from said implement to said vehicle end,
    b. first and second control links each pivotably connected at one end thereof to said vehicle end and pivotably connected at the other end thereof to said coupler link, said first and second control links being of substantially different lengths and in general parallel relation with each other, the pivotable connections of the two control links to said vehicle being on a horizontal line and spaced further apart than the pivotable connection of said control links to said coupler link, the pivotable connections of said control links to said coupler link being both between the ends of said coupler link, and
    c. means on said vehicle end and on the same horizontal line as said pivotable connections of said control links to said vehicle, said means being engaged with the other end of said coupler link for permitting horizontal movement of said other coupler link end relative to said vehicle while restraining vertical movement of said other end of the coupler link relative to said vehicle.

2. The improvement as set forth in claim 1 wherein said means (c) comprises a bracket mounted on said vehicle end, said bracket having a horizontally extending slot, and wherein said other coupler link end has a pin extending therefrom, said pin being received within said slot.

* * * * *